W. D. WERTS.
REAR AXLE CONSTRUCTION.
APPLICATION FILED AUG. 18, 1919.
1,372,381.
Patented Mar. 22, 1921.
3 SHEETS—SHEET 1.
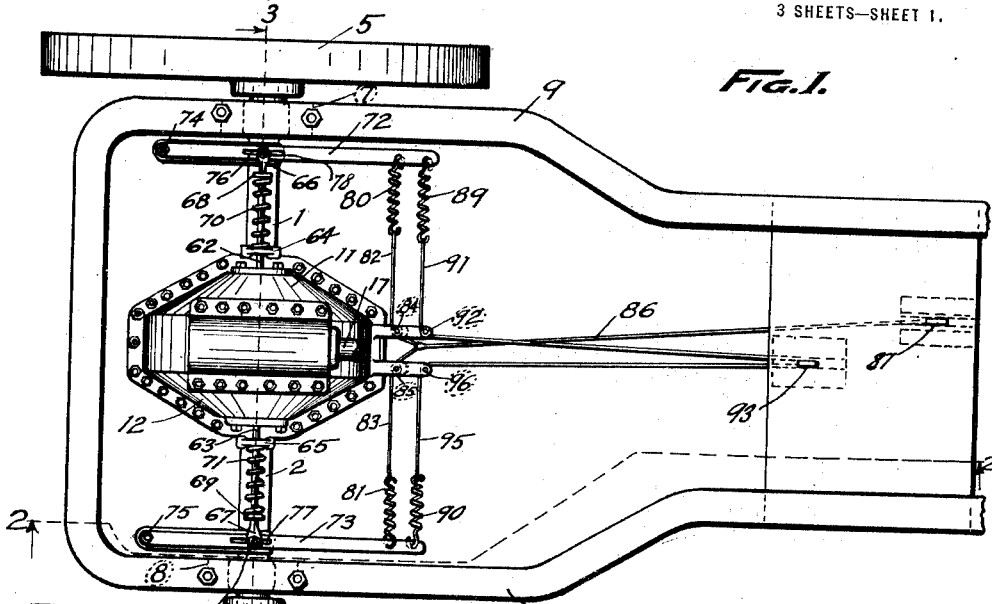
Fig.1.
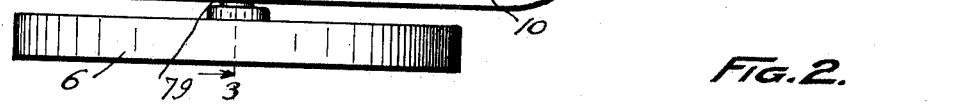
Fig.2.
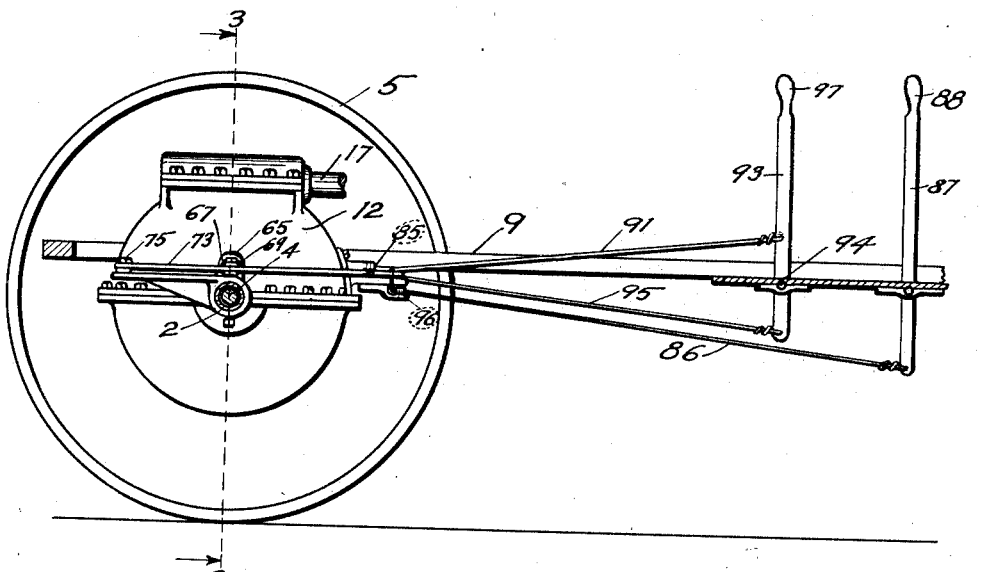
INVENTOR.
WILLIAM D. WERTS.
BY Hazard & Miller
ATTORNEYS.

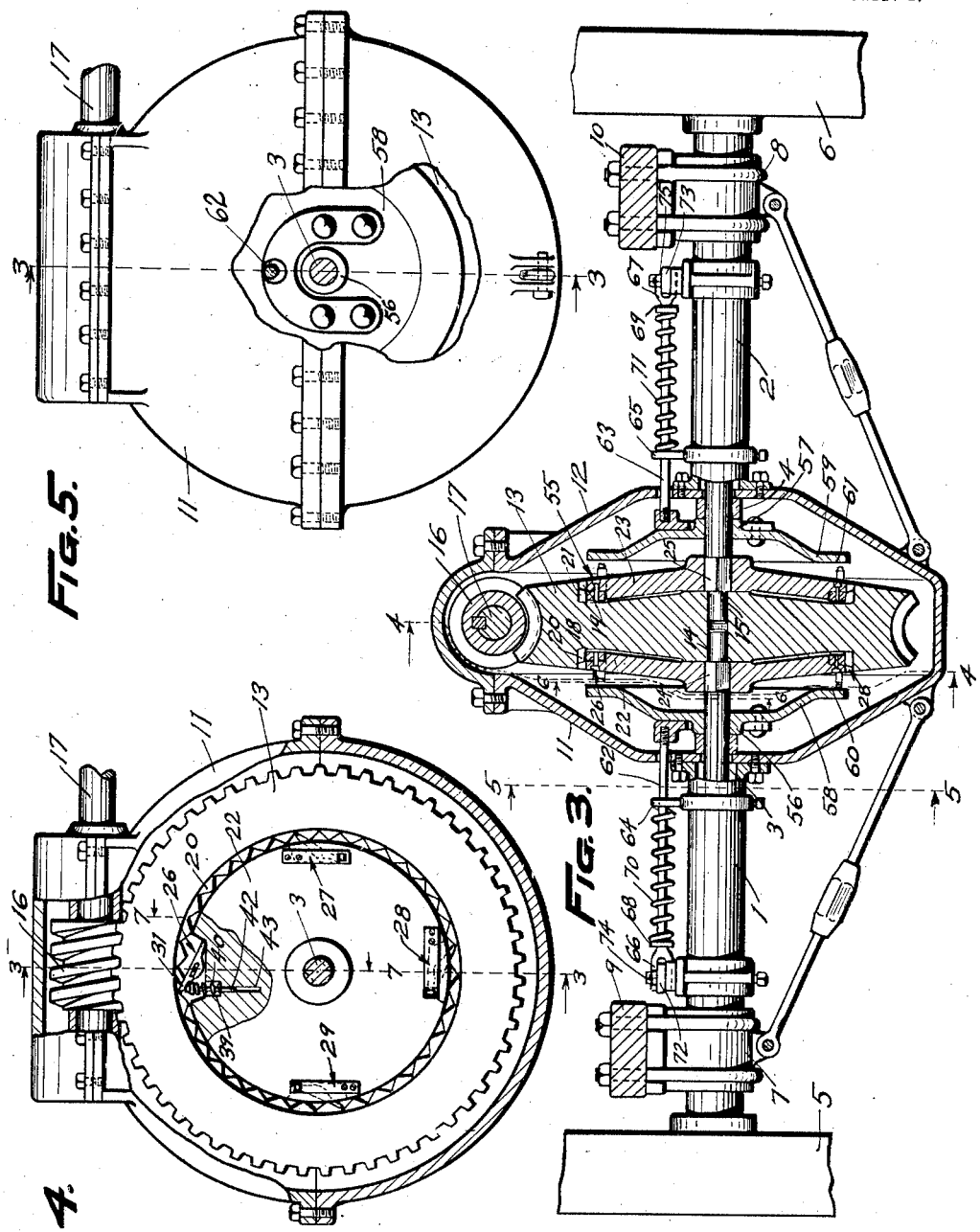

W. D. WERTS.
REAR AXLE CONSTRUCTION.
APPLICATION FILED AUG. 18, 1919.
1,372,381.
Patented Mar. 22, 1921.
3 SHEETS—SHEET 3.
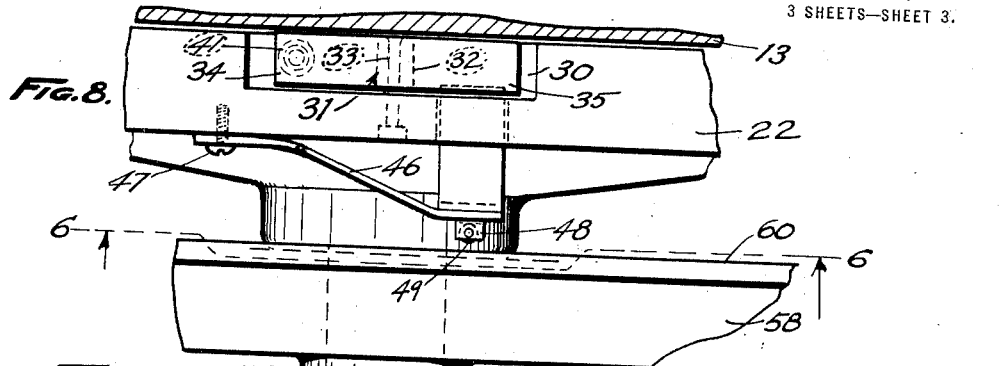
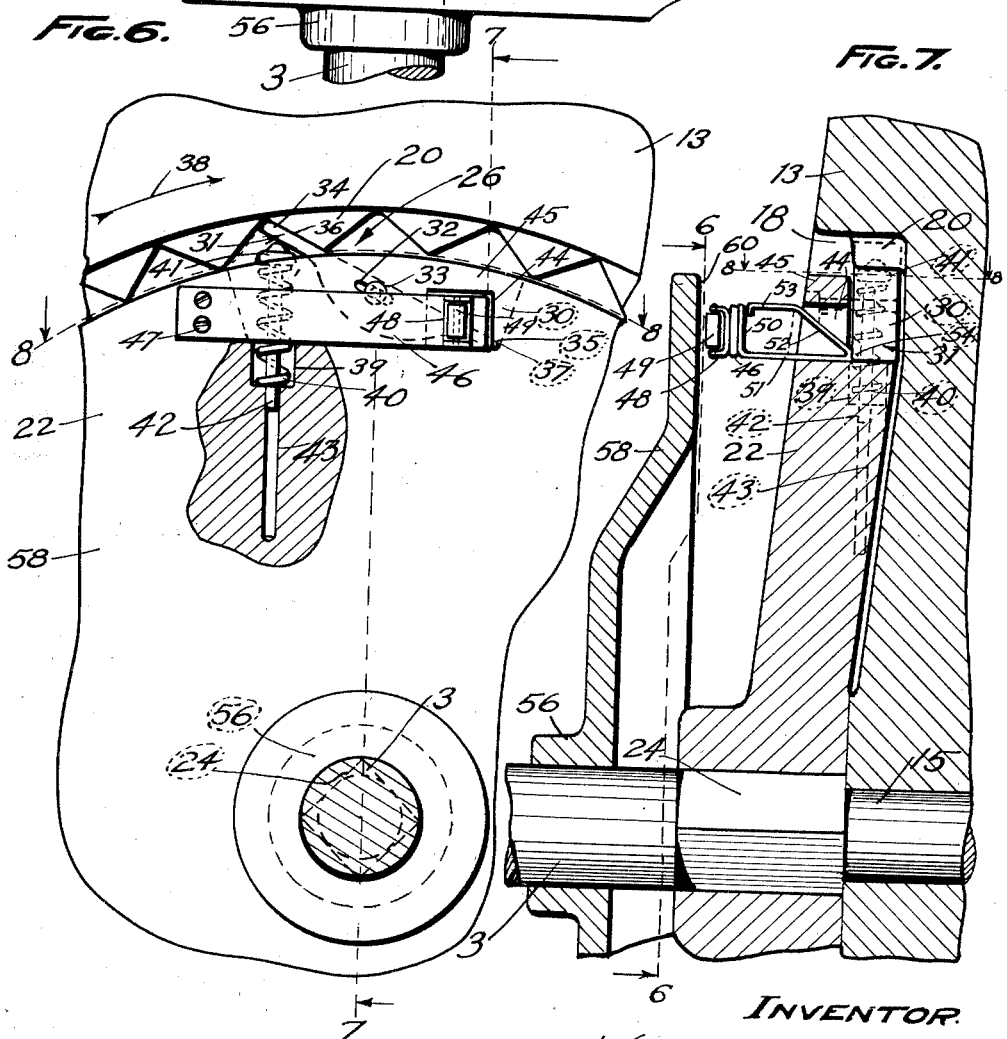
INVENTOR.
WILLIAM D. WERTS
BY Hazard & Miller
ATTORNEYS.

UNITED STATES PATENT OFFICE.

WILLIAM D. WERTS, OF LOS ANGELES, CALIFORNIA, ASSIGNOR OF ONE-TENTH TO GEORGE FELDCAMP AND ONE-TENTH TO JOSEPH SCHERER, OF LOS ANGELES, CALIFORNIA.

REAR-AXLE CONSTRUCTION.

1,372,381.   Specification of Letters Patent.   Patented Mar. 22, 1921.

Application filed August 18, 1919. Serial No. 318,385.

*To all whom it may concern:*

Be it known that I, WILLIAM D. WERTS, a citizen of the United States, residing at Los Angeles, in the county of Los Angeles and State of California, have invented new and useful Improvements in Rear-Axle Constructions, of which the following is a specification.

My invention relates to a motor vehicle rear axle and differential gearing construction and consists of the novel features herein shown, described and claimed.

The principal objects of my invention are to generally improve upon and simplify the construction of the present types of differential gearing, particularly those utilized in motor vehicles; to construct a differential gearing that is devoid of the usual beveled or miter gears, and further, to provide a rear axle and differential gearing construction that will possess superior advantages in point of simplicity, durability and general efficiency.

Figure 1 is a top plan view of a rear axle construction embodying the principles of my invention, the view being taken looking in the direction indicated by the arrow 1 in Fig. 2.

Fig. 2 is a sectional elevation on the line 2—2 of Fig. 1.

Fig. 3 is a vertical sectional detail crosswise of the vehicle longitudinally of the rear axle, the view being taken on the lines 3—3 of Figs. 1 and 2.

Fig. 4 is a vertical sectional detail crosswise of the axle and on the line 4—4 of Fig. 3 and looking in the direction indicated by the arrows.

Fig. 5 is a vertical sectional detail crosswise of the axle on a plane substantially parallel with Fig. 4, and on the line 5—5 of Fig. 3 and looking in the direction indicated by the arrows.

Fig. 6 is an enlarged fragmentary sectional detail on a plane parallel with Fig. 4 and on the lines 6—6 of Figs. 3, 7 and 8.

Fig. 7 is a sectional detail on the lines 7—7 of Figs. 4 and 6.

Fig. 8 is a fragmentary sectional detail on the lines 8—8 of Figs. 6 and 7.

The rear axle housing is made in two main pieces 1 and 2, and the rear axle is made in two main pieces 3 and 4 rotatably mounted in the housing pieces 1 and 2, and the wheels 5 and 6 are fixed upon the outer ends of the axle pieces 3 and 4. The axle housing parts 1 and 2 are fixed in the bearings 7 and 8, and the bearings 7 and 8 are fixed to the frame side bars 9 and 10.

The gear casing has sides 11 and 12 rigidly secured to the inner ends of the axle housing pieces 1 and 2. The worm gear 13 is rotatably mounted upon pintles 14 and 15 that project inwardly from the rear axle pieces 3 and 4. The driving worm 16 meshes with the worm gear 13 and the driving shaft 17 extending from the worm 16 is connected to the engine, not shown, so that as the engine runs the gear 13 is rotated forwardly or backwardly.

Recesses 18 and 19 are formed in the sides of the worm gear 13 and V-shaped teeth 20 and 21 extend inwardly around the recesses 18 and 19 to form annular clutch faces on said worm gear. The inner clutch members 22 and 23 fit in the recesses 18 and 19 and are fixed upon the non-circular portions 24 and 25 of the rear axle pieces 3 and 4, so that when the clutch members 22 and 23 are driven the axle pieces 3 and 4 are driven to drive the rear wheels 5 and 6. The inner clutch member 22 has reversible clutching dog constructions 26, 27, 28 and 29.

Referring to Figs. 6, 7 and 8, the details of the reversible dog construction 26 are as follows:

A recess 30 is formed in the periphery of the clutch member 22. A reversible dog 31 is placed in the recess 30, said reversible dog having a slot 32 through its center for the accommodation of a fulcrum pin 33 fixed in the clutch member 22. The dog 31 has ends 34 and 35 extending equal distances from the slot 32, so that when the dog 31 is tilted upon the pin 33 and the end 34 thrown outwardly it will engage in one of the notches 36 between the V-shaped teeth 20 and against one of the latter, and the end 35 will engage the side 37 of the recess 30, so that when the worm gear 13 is driven in the direction indicated by the arrow 38 the inner clutch member 22 will be driven in the same direction to drive the axle piece 3.

A spring pocket is formed by making a bore 39 at the bottom of the recess 30 and positioned in said pocket is a spring 40. A push pin 41 is placed against the outer end of the spring 40 under the end 34 and has a stem 42 extending through the spring 40 into a bearing bore 43 extending from the bottom of pocket 39, so that the tension of the spring 40 is exerted to throw the end 34 of dog 31 outwardly, or into its normal worm gear engaging position.

An opening 44 is formed through the flange 45 forming the outer side of the recess 30. A leaf spring 46 is secured to the outer face of the member 22 by screws 47, and the free end of the spring 46 is in line with the opening 44. A roller bracket 48 is secured to the outer face of the free end of the spring and journaled therein is a roller 49. A cam is formed of resilient material and comprises an attaching plate 50 that is secured to the inner face of the leaf spring 46 in line with the bracket 48, an arm 51 extending at right angles from the inner end of the attaching plate 50 into the opening 44, an inclined arm 52 extending upwardly and backwardly from the end of said arm 51, and an arm 53 extending from the arm 52 parallel with the arm 51.

The point 54 at the junction of the arms 51 and 52 is in position to pass under the end 35 of the dog 31, so that when pressure is applied to the roller 49 the spring 46 is bent inwardly and the cam passes under the end 35 and overcomes the tension of the spring 40 and reverses the dog and throws the end 35 outwardly into a groove 36 against one of the teeth 20 as required to drive the vehicle backwardly.

The details of the reversible dog constructions 27, 28 and 29 are the same as the details of the construction 26 just described, the object being to have a plurality of dogs for strength and safety.

The other clutch member 23 is provided with a reversible dog construction 55 to engage the teeth 21 the same as the reversible dog construction 26, just described.

Hubs 56 and 57 are slidingly mounted upon the rear axle pieces 3 and 4 and disks 58 and 59 that are fixed to said hubs have bearing faces 60 and 61 that are adapted to engage the rollers 49 and press the cams inwardly to throw the dogs 31 into either reverse or neutral positions. The dogs 31 are in neutral positions when the cams are moved inwardly substantially half way so that neither the ends 34 nor the ends 35 engage the teeth 20.

Rods 62 and 63 are connected to the disks 58 and 59 and slide through the sides 11 and 12 and slide through bearings 64 and 65 mounted rigidly upon the axle housing pieces 1 and 2, and the rods have bifurcated bearings 66 and 67 at their outer ends. Spring seats 68 and 69 are formed on rods 62 and 63 adjacent to bearings 66 and 67, and expansive coil springs 70 and 71 are arranged upon said rods between seats 68 and 69 and bearings 64 and 65, the tensions of said springs being exerted to throw the rods 62 and 63 outwardly to hold the disks 58 and 59 and clutches in their normal positions or engaged with worm wheel 63 so as to drive the vehicle forwardly.

Levers 72 and 73 are connected to the frame at their rear ends by pivots 74 and 75 and the central portions of the levers 72 and 73 have slots 76 and 77, and the bifurcated bearings 66 and 67 embrace the levers, and pins 78 and 79 are inserted through the bearings 66 and 67 and through the slots 76 and 77 so as to pivotally connect said rods and levers.

Retractile coil springs 80 and 81 are connected to the forward ends of the levers 72 and 73. Cords 82 and 83 are connected to the inner ends of the springs 80 and 81 and pass around guide rollers 84 and 85 and are connected together, and a cord 86 extends from the connected ends of the cords 82 and 83 and is connected to the lower end of the reversing lever 87, so that when the handle 88 of the reversing lever is grasped and swung backwardly the levers 72 and 73 are moved inwardly to move the rods 62 and 63 inwardly to press the disks 58 and 59 against the rollers 49 to operate the cams to reverse the dogs and drive the vehicle backwardly. When the handle 88 is released the springs will restore the parts to their normal positions to drive the vehicle forwardly.

Retractile coil springs 89 and 90 are connected to the forward ends of the levers 72 and 73. A cord 91 is connected to the inner end of the spring 89 and runs around a guide roller 92 and forwardly and is connected to the operating lever 93 above the pivot 94, and a cord 95 is connected to the inner end of the spring 90 and runs around a guide roller 96 and forwardly and is connected to the operating lever 93 below the pivot 94, so that when the handle 97 of the lever 93 is grasped and operated and moved forwardly the cord 91 will be pulled to actuate lever 72 to move the rod 62 inwardly to disconnect the clutch member 22 from the worm gear 13, and simultaneously cord 95 will be slackened a sufficient degree to permit spring 71 to act to disconnect the clutch member 23 from the worm gear 13, and in this way either rear wheel 5 or 6 may be driven without driving the other wheel.

Obviously when one of the rear wheels of the vehicle runs faster than the other, as in turning, the dogs on the clutch member that is moving at the greatest speed will slip over the teeth on the worm wheel 13 with which they normally engage.

A rear axle construction and differential gearing of my improved construction is relatively simple, can be easily assembled or taken apart, is positive in action and is entirely devoid of all beveled or miter gears, and which latter have certain disadvantages such as liability of breakage of teeth and the development of noise when the teeth become worn in service.

It will be readily understood that minor changes in the size, form and construction of the various parts of my improved rear axle construction may be made and substituted for those herein shown and described without departing from the spirit of my invention, the scope of which is set forth in the appended claims.

I claim:

1. A rear axle construction comprising a rear axle housing made in two pieces, a casing connecting the inner ends of the housing, a rear axle made in two pieces mounted in the rear axle housing and having pintles at their meeting ends, a worm gear loosely mounted upon said pintles and having annular rows of teeth on its side faces, disks fixed upon the axle pieces adjacent to the side faces of the worm gear, reversible dog constructions for selectively engaging either of the annular rows of teeth on the worm wheel to lock the corresponding disk to said worm wheel, and means for operating the reversible dog constructions.

2. A rear axle construction comprising a rear axle housing made in two pieces, a casing connecting the inner ends of the housing, a rear axle made in two pieces rotatably mounted in the rear axle housing pieces, rear wheels upon the outer ends of the rear axle pieces, pintles extending inwardly from the inner ends of the rear axle pieces, a worm gear loosely mounted upon the pintles, and provided on its side faces with annular rows of teeth, a worm for driving the worm gear, disks fixed upon the axle pieces to the side of the worm gear, reversible dog constructions for selectively connecting the disks to the worm wheel, springs for holding the reversible dog constructions in normal positions to drive the vehicle forwardly, and hand levers for operating the reversible dog constructions to shift the latter into their neutral or reverse position, or into position to drive either one of the rear axle parts independently of the other.

3. In a rear axle construction, a pair of alined wheel carrying axle members, a worm wheel loosely journaled on the inner ends of said axle members, a power driven worm in engagement with the teeth of said worm wheel, the side faces of said worm wheel being recessed, and the outer faces of said recesses having formed therein annular rows of teeth, disks fixed on the axle pieces and positioned in the recesses in the sides of said worm wheel, a plurality of spring held dogs pivotally mounted on the peripheries of each disk, both ends of each dog being adapted to engage with the adjacent teeth on the worm wheel, and spring held members mounted on the disks and adapted, when pressed inwardly, to reverse the positions of said spring held dogs.

4. In a rear axle construction, a pair of alined wheel carrying axle members, a worm wheel loosely journaled on the inner ends of said axle members, a power driven worm in engagement with the teeth of said worm wheel, the side faces of said worm wheel being recessed, and the outer faces of said recesses having formed therein annular rows of teeth, disks fixed on the axle pieces and positioned in the recesses in the sides of said worm wheel, a plurality of spring held dogs pivotally mounted on the peripheries of each disk, both ends of each dog being adapted to engage with the adjacent teeth on the worm wheel, spring held members mounted on the disks and adapted, when pressed inwardly, to reverse the positions of said spring held dogs and means for selectively actuating the spring held members of either one or both of said disks.

5. In a rear axle construction, a pair of alined wheel carrying axle members, a worm wheel loosely mounted on the adjacent inner ends of said axle members, the side faces of said worm wheel being recessed and the edge of each recess being provided with an annular row of teeth, disks fixed on the axle members and positioned in the recesses in said worm wheel, the peripheries of said disks being provided with pockets, a double ended dog positioned in each pocket and fulcrumed upon the disk, and a spring associated with each dog for normally maintaining one of its ends in engagement with the adjacent annular row of teeth in the worm wheel.

6. In a rear axle construction, a pair of alined wheel carrying axle members, a worm wheel loosely mounted on the adjacent inner ends of said axle members, the side faces of said worm wheel being recessed and the edge of each recess being provided with an annular row of teeth, disks fixed on the axle members and positioned in the recesses in said worm wheel, the peripheries of said disks being provided with pockets, a double ended dog positioned in each pocket and fulcrumed upon the disk, a spring associated with each dog for normally maintaining one of its ends in engagement with the adjacent annular row of teeth in the worm wheel and means for reversing the positions of the dogs on each disk.

In testimony whereof I have signed my name to this specification.

WILLIAM D. WERTS.